United States Patent [19]
Robinsky

[11] Patent Number: 4,861,498
[45] Date of Patent: Aug. 29, 1989

[54] BACKWASH SYSTEM FOR FILTER-THICKENERS

[75] Inventor: Eli I. Robinsky, Toronto, Canada

[73] Assignee: R & L Filtration Limited, Toronto, Canada

[21] Appl. No.: 139,531

[22] Filed: Dec. 30, 1987

[51] Int. Cl.⁴ .............................................. B01D 29/38
[52] U.S. Cl. .................................... 210/791; 210/798; 210/333.1; 210/408; 210/412
[58] Field of Search ............ 210/323.2, 333.01, 333.1, 210/408, 411, 412, 791, 798

[56] References Cited

U.S. PATENT DOCUMENTS

| 207,515 | 8/1878 | Haas | 210/411 |
|---|---|---|---|
| 1,452,151 | 4/1923 | Genter et al. | 210/412 |
| 1,642,673 | 9/1927 | Genter | 210/798 |
| 2,423,172 | 7/1947 | Booth | 210/798 |
| 2,862,622 | 12/1958 | Kircher, Jr. et al. | |
| 3,356,215 | 12/1967 | Miles, Jr. | 210/798 |
| 3,834,535 | 9/1974 | Portyrata | 210/798 |
| 3,935,105 | 1/1976 | McEwen | 210/138 |
| 4,243,533 | 1/1981 | Savolainen et al. | 210/333.01 |
| 4,264,445 | 4/1981 | Lumikko et al. | 210/333.01 |
| 4,552,656 | 11/1985 | Solomon | 210/137 |
| 4,814,080 | 3/1989 | Sauvaget | 210/323.2 |

FOREIGN PATENT DOCUMENTS

| 69942 | 1/1959 | France | 210/408 |
|---|---|---|---|
| 1276086 | 10/1961 | France | 210/412 |
| 1290843 | 3/1962 | France | . |
| 404309 | 1/1934 | United Kingdom | . |
| 603443 | 6/1948 | United Kingdom | . |
| 904946 | 9/1962 | United Kingdom | . |

Primary Examiner—Richard V. Fisher
Assistant Examiner—Coreen Y. Lee
Attorney, Agent, or Firm—Arne I. Fors; Robert F. Delbridge

[57] ABSTRACT

A method and apparatus for backwashing filter elements in a filter vessel. At least one collapsible bladder in the form of a tube is suspended together with a plurality of filter elements in a mixture compartment of a vessel for filtering solids from a liquid-solids mixture, the tube having a volumetric displacement at least as great as the volume of filtrate required to flow from a filtrate compartment into the filter elements to slightly expand filter fabric enveloping the filter elements to disengage filtercake deposited thereon. Means are provided to fill the tube with fluid for expansion thereof and to rapidly empty fluid from the tube for sudden collapse of the tube and attendant rapid reverse flow of filtrate from the filtrate compartment.

15 Claims, 5 Drawing Sheets

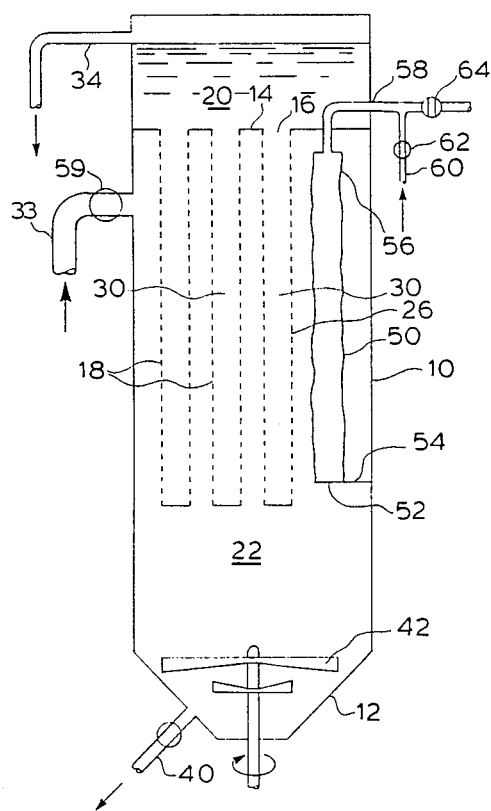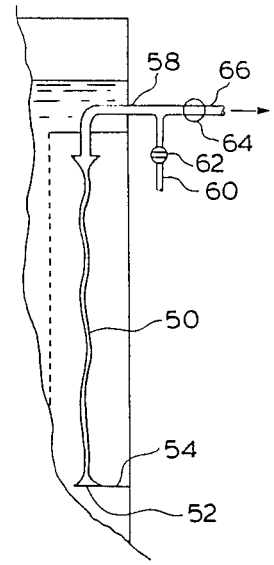

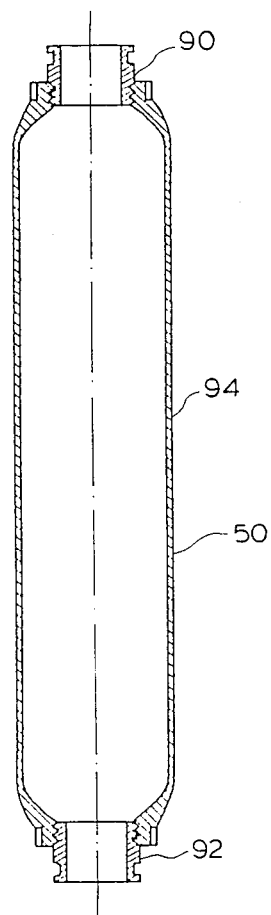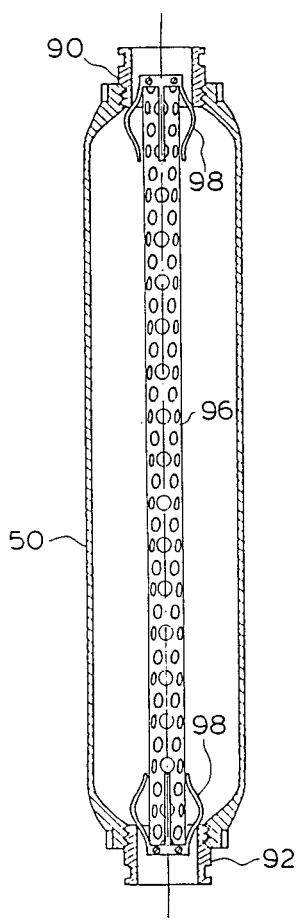

4,861,498

BACKWASH SYSTEM FOR FILTER-THICKENERS

BACKGROUND AND SUMMARY OF THE INVENTION

This invention relates to a method and apparatus for thickening mixtures of solids and liquids by the removal of some of the liquid from the mixture by means of filtration and, more particularly, relates to the backwashing of filter elements for the disengagement of filtercake therefrom.

More specifically, the invention relates to a novel method and apparatus for creating a reversal of pressure across a filter element to perform a necessary backwash in well-known pressure filters that operate cyclically (for example, U.S. Pat. Nos. 1,716,040, 3,356,215 and 4,243,533; and U.K. Pat. Nos. 603,443 and 904,946). The filtration in such apparatus is effected by a number of generally circular hollow filtering elements submerged in a vessel containing the mixture to be filtered and thickened. The vessel is supplied with the mixture by a valved inlet. The filter elements include a rigid mesh tube or perforated pipe closed at the lower end and open at the upper end thereof. The tubes are enveloped by suitable filtering media such as synthetic filter fabrics (for example, as referred to in U.S. Pat. Nos. 1,716,040, 3,233,739 and 3,356,215). The filter elements are suspended hermetically from a perforated deck within the vessel and the interior of the elements is in open contact with an overlying filtrate compartment of the vessel where the filtered liquid, i.e. as filtrate, accumulates and from where the filtrate is discharged. The bottom of the vessel contains a valved outlet for discharge of the thickened product and may also contain a rake or mixer to assist in the removal of the thickened product. The filtration cycle consists of a period of filtration followed by backwashing or cleansing of the filter elements. During the filtration period the solids, not being able to pass through the filter media, collect on the outside surfaces of the filter elements to form a layer of filtercake, while the filtered liquid flows through the elements as filtrate to accumulate in the overlying filtrate compartment from where it is withdrawn. During the backwash period the filtercake is disengaged from the surfaces of the filter elements by causing the filtrate to flow in the reverse direction for a short period of time. The filtercake pieces, being heavier than the surrounding liquid-solids mixture, settle towards the bottom of the vessel from where they are extracted, together with some of the untreated mixture trapped between the filtercake pieces, as a thickened product.

The filtration period normally is continued until the flow of filtrate is reduced to a degree that is considered unproductive due to the progressive blinding of the filter element surfaces by the build-up of filtercake. As the build-up occurs, the pressure differential between the inside and outside of the filter elements will also increase. The filtering period may thus be automatically stopped and the backwash period initiated by monitoring of the rate of filtrate production, or by the automatic monitoring of the pressure differential between the inside and outside of the filter elements.

As established by the well-known art therefore, the process of filtration and backwashing is attained by reversing the pressure differential across the walls of the filter elements. Various means are used for attaining the requisite pressure differential. In most of the disclosed art the filtration period consists of pressure-feeding the vessel containing the filter elements with the mixture to be filtered and thickened. At this time the filtrate compartment is either vented to the atmosphere or, in designs where the filtrate compartment is enclosed, a vacuum may be applied to this compartment. In yet another design with an enclosed filtrate compartment, an amount of air forcibly compressed therein by the upflowing filtrate under the filtration feed pressure is subsequently used as a means of applying a pressure to the filtrate in the filtrate compartment for backwashing while closing off the mixture feed and releasing some of the thickened product from the bottom of the vessel, thus reversing the pressures and causing the reversed flow of liquid through the filter elements.

Other minor variations to the systems for reversing the differential pressures have been proposed. However, the common feature to all systems is that the mixture feed to the specific filter elements that are to be backwashed is stopped during the backwash cycle. In some disclosures, compressed air is fed into the filtrate compartment while releasing some of the thickened product from the bottom of the tank, in others the filtrate compartment remains open to the atmosphere while again releasing some of the thickened product from the vessel.

This invention relates to a new method of creating a reversal of differential pressures for backwashing purposes within a filter vessel, such as has been described. It is particularly applicable to the simple type of filter vessel where the filtrate compartment equipped with an overflow remains constantly open to the atmosphere for easy accessibility and maintenance of the filter elements, and the filtering pressure during the filtration period of the cycle is created only by line pressure of the mixture being fed into the vessel.

STATEMENT OF INVENTION

The invention is characterized by the introduction of a collapsible bladder which in the present description is exemplified by a fabric-reinforced rubber tube located inside the same mixture compartment of the vessel that contains the filter elements. The tube is filled during or before the pressure cycle with a fluid such as compressed air or a liquid such as filtrate or clean water by means of a circuit which is independent of the liquid handled within the vessel. When backwashing of the filter elements is required, the air or liquid within the rubber tube is released to atmospheric pressure very rapidly. The escape of air or liquid occurs simply by the squeezing pressure acting on the tube from the surrounding solids/liquid mixture plus the hydrostatic pressure transmitted from the overlying filtrate compartment. In addition, a syphon effect develops if the water alternative of the invention is used in this connection. This occurs by the action of gravity forces acting on the liquid within the tube and within the downward outlet pipe connected to the tube. As the mixture within the mixture compartment moves immediately into the volume once occupied by the expanded and now collapsing tube, the pressure within the mixture compartment, outside the filter elements, drops to less than the pressure within the filter elements, thus reversing the flow through the elements and initiating the backwash period of the cycle.

In its filled or expanded form the tube volume is at least as great as and preferably slightly greater than the volume of filtrate required to flow down into the filter elements from the overlying filtrate compartment to slightly expand the filter fabric enveloping them, and to provide enough filtrate to flow through the walls and fabric of the filter elements to disengage the filtercake that has formed on their surfaces during the filtration period.

The volume of the tube may also be made large enough to compensate for the continuing introduction of the unthickened mixture into the vessel even as the backwash occurs. This modification can be employed if the available air pressure or the liquid pressure involved in the backwash operation is adequate to refill and expand the tube to its full diameter after the completion of the backwash period in spite of the feed pressure of the mixture entering the mixture compartment. The backwash period is normally less than eight seconds in duration and thus only a small quantity of unthickened mixture will enter the vessel even if the inflow valve is not closed. Such a procedure permitted by this embodiment advantageously eliminates the need for continually opening and closing the inflow valve.

Another advantage of the present invention is that the thickened product may be removed continuously from the bottom of the mixture compartment and such discharge is not dependent on the cyclical filtration operation. The deeper the thickened product, which is comprised of filtercake pieces and untreated mixture trapped therebetween, is allowed to accumulate at the bottom of the mixture compartment prior to being discharged, the more concentration of the thickened product occurs by the continuing addition of newly disengaged filtercake pieces settling after each backwash period.

Yet another advantage of the invention is its simplicity in structure and operation. These and other advantages of the method and apparatus of the invention will become more apparent from an examination of the drawings and description as given hereunder.

In its broad aspects, the apparatus of the invention for filtering solids from a liquid slurry or mixture comprises in a vessel having a lower mixture compartment and an upper filtrate compartment, a filter element enveloped by a filter fabric suspended from said filtrate compartment into the mixture compartment, and means for supplying a liquid-solids mixture to the mixture compartment under pressure for passing liquid through the filter element with the deposit of filtercake on the filter fabric and flow of filtrate to the filtrate compartment, the improvement for backwashing the filter element with filtrate comprising a collapsible tube suspended in the mixture compartment, said tube having an expanded volumetric displacement at least as great as the volume of filtrate required to flow from the filtrate compartment into the filter elements to slightly expand the filter fabric and to detach and disengage the filtercake thereon, and means to fill said tube with fluid for expansion thereof and to rapidly empty fluid from said tube for sudden collapse thereof.

In an embodiment of the invention, the tube has an open end and a closed end and means for admitting a fluid such as air under pressure greater than the pressure of the surrounding mixture in the mixture compartment, said admitting means being connected to the open end of the tube and having valving means for selectively introducing the fluid under pressure for expanding the tube and rapidly discharging fluid from the tube for sudden collapse of the tube.

In another embodiment of the invention, said tube may be open at the bottom end for supplying the tube with a liquid under pressure to expand the tube and for discharging the liquid to collapse the tube. A sump positioned below the vessel is in communication with the open end of the tube for receiving the liquid from the tube, a pump in communication with the sump is adapted to recycle the liquid from the sump back to the tube, and valves are provided to either release the liquid rapidly into the sump or to permit the pump to refill and expand the tube after completion of the backwash period.

In a further embodiment of the invention, said tube may be suspended within the mixture compartment with the open end up with means for admitting a liquid which could be filtrate liquid from the filtrate compartment or other liquid such as water in a separate alternate compartment, means comprising a pump having a suction line extending into the said filtrate or alternate compartment, and into the tube, and valving means for selectively receiving liquid from the said filtrate or alternate compartment, or the tube, said pump having a discharge line extending back into the said liquid compartments or into the tube, and said suction and discharge lines having valving means for selectively discharging filtrate or other liquid into the said alternate compartments or into the tube, whereby the tube can be filled by liquid pumped from the said compartments or suddenly collapsed by pumping filtrate from the tube back into the said compartments.

In a still further embodiment of the invention, said tube may be open at both ends, a reservoir mounted at a height greater than the height of the vessel and containing a liquid is in communication with said tube for supplying the liquid under gravity pressure to the top end of the tube, a sump positioned below the vessel is in communication with the other end of the tube for receiving the liquid from the tube, a pump in communication with the sump is adapted to recycle the liquid from the sump to the reservoir, and a valve is provided at each of the reservoir end and the sump end of the tube whereby opening of the reservoir valve and closing of the sump valve permits filling of the tube, and closing of the reservoir valve and opening of the sump valve permits draining of liquid from the tube with sudden collapse thereof.

BRIEF DESCRIPTION OF THE DRAWINGS

The principal features of the invention are described with reference to the accompanying drawings wherein:

FIG. 1 displays schematically in a side elevation the basic embodiment of the apparatus of the present invention within a typical filter-thickener wherein the backwash-activating fluid is compressed air;

FIG. 2 is a fragmentary side elevation of the apparatus shown in FIG. 1 illustrating the tube in collapsed form;

FIG. 7 illustrates, in section, an embodiment of the internal bladder construction of the tube; and FIG. 8 displays a modification of the internal bladder construction shown in FIG. 7.

DESCRIPTION OF THE PREFERRED EMBODIMENTS

Figure 3:
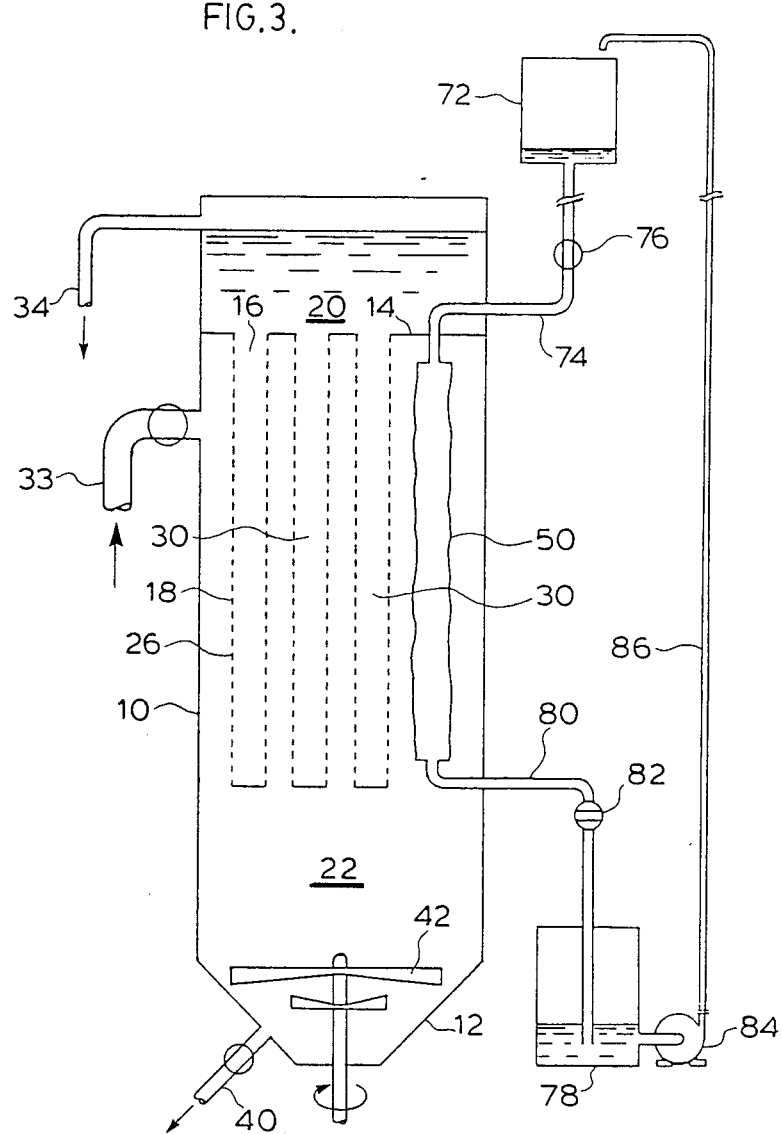
FIG. 3 displays schematically in a side elevation another basic embodiment of the apparatus of the invention adapted to a typical filter-thickener wherein the backwash-activating fluid is a clean liquid such as water.

With reference to FIG. 1 of the drawings, the typical filter-thickener of the invention comprises a cylindrical upright vessel 10 usually having a conical hopper bottom 12. A horizontal plate 14 having a plurality of preferably equispaced openings 16 for supporting filter elements 18 extends across the vessel 10 near the upper end thereof to divide the vessel into an upper filtrate compartment 20 for receiving filtrate and a lower larger compartment 22 for receiving the liquid-solids mixture to be filtered.

Filter elements 18, in the form of elongated tubes of rigid or semi-rigid construction, extend downwardly from plate 14 into mixture compartment 22 and are each held in place by an enlarged sealing collar, not shown, affixed to the top end of the filter tube. The filter tubes are covered with filter media such as a synthetic filter fabric or cloth 26, hereinafter referred to as "filter fabric", which envelopes the sides of the filter tubes, bottoms normally being closed. The tops of the tubes 18 remain open to communicate the interior 30 of the tubes with upper filtrate compartment 20.

The mixture to be filtered is fed to the mixture compartment 22 through inlet 33 at a pressure greater than the static pressure in compartment 22. The liquid component of the mixture passes through filter fabric 26 into the interior 30 of each of the filter tubes 18 and rises into filtrate compartment 20 to overflow for discharge out of outlet pipe 34. The solids component of the mixture collects on the exterior of filter cloth 26 as filtercake for subsequent cyclic disengagement to sink by gravity into hopper bottom 12 of the vessel for discharge as a thickened product out of discharge outlet 40. Rake agitator 42 adapted to rotate within hopper bottom 12 provides continuous agitation of the thickened product for discharge from the vessel.

With reference now to FIGS. 1 and 2, elongated tube 50 in the form of a bladder closed at the lower end 52, which is secured to the sidewall of vessel 10 by bracket 54, is supported at its upper end 56 by plate 14 and supplied with air under pressure through line 58 in communication with air supply line 60 having valve 62. In its expanded pressurized condition as shown in FIG. 1, tube 50 displaces a volume of mixture at least as great as and preferably slightly greater than the volume of filtrate required to flow down into the filter elements 18 from filtrate compartment 20 to slightly expand the filter fabric enveloping the filter tubes and to provide sufficient filtrate to flow through the filter fabric to disengage the filtercake that has formed on the filter fabric surfaces during the filtration cycle.

Tube 50 more preferably displaces a volume of mixture not only slightly greater than the volume of filtrate necessary to slightly expand the said filter fabric and to disengage the filtercake but also to compensate for the continuing introduction of unthickened mixture into the vessel during the backwash operation. This embodiment obviates the need for opening and closing inflow valve 59 which may have to be otherwise closed during a portion of the backwash operation to avoid competition with the volume of mixture that would otherwise be introduced into the vessel.

Turning now to FIG. 2, the valve 62 in inlet line 60 is shown closed and valve 64 in discharge line 66 is shown open. Air under pressure in tube 50 sufficient to maintain the tube expanded against the pressure in compartment 22 during the filtration cycle has been allowed to escape through line 66 under the static head of the slurry in compartment 22 and of the filtrate in compartment 20 to rapidly collapse tube 50 to the configuration illustrated in FIG. 2. The sudden reduction in volume of the tube 50 results in a rapid reverse flow of filtrate from filtrate compartment 20 into the interior 30 of the filter elements 18 in an amount described above to not only expand the filter fabric but also to flow through the filter fabric and disengage the filtercake formed thereon. The filtercake sinks by gravity into hopper bottom 12 where it is maintained as thickened product by rake 42 for continuous discharge through outlet 40. Although the embodiment of the invention shown in FIGS. 1 and 2 has tube 50 closed at its lower end 52 and open at its upper end 56 to receive fluid through line 58, it will be understood that tube 50 could be inverted with the closed end elevated above the open end and a feed line in communication with the said lower open end as will become evident from the description below of further embodiments of the invention.

FIG. 3 illustrates another embodiment of the invention in which tube 50, vertically suspended within slurry compartment 22 at its upper end and supported by plate 14, is communicated with liquid reservoir 72 by line 74 having valve 76. The lower end of tube 50 is connected to liquid sump 78 by line 80 having valve 82 therein. A pump 84 is adapted by way of recycle line 86 to transfer liquid from sump 78 to reservoir 72.

In operation, tube 50 is filled from reservoir 72 by the opening of valve 76 in line 74 while valve 82 is closed. Reservoir 72 is elevated sufficiently above the height of vessel 10 to provide a liquid pressure within tube 50 greater than the static pressure of the slurry within compartment 22. The opening of valve 82 and closing of valve 76 results in rapid draining of liquid from tube 50 into sump 78 with the resulting collapse of tube 50 causing a filtrate flow downwardly into filter elements 18 for reverse flow through the filter elements to slightly expand the filter fabric enveloping the elements and to disengage the filtercake that had formed on the filter fabric surfaces during the filtration cycle.

Figures 4, 5:
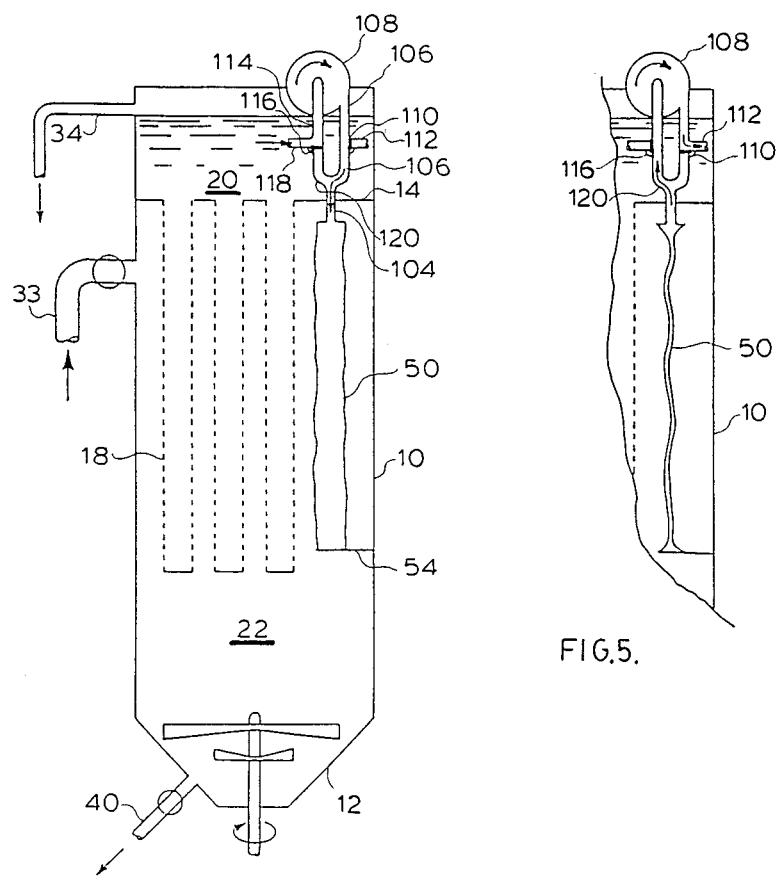
FIG. 4 is a side elevation which illustrates schematically another embodiment of the invention.
FIG. 5 is a fragmentary side elevation of the apparatus shown in FIG. 4 illustrating the system with the tube in collapsed form.

FIGS. 4 and 5 illustrate another embodiment of my invention in which elongated tube 50 is secured at its lower end by bracket 54 to the wall of vessel 10 and is secured at its upper end to horizontal plate 14 by inlet tube 104 which is in communication with the discharge line 106 of continuously running centrifugal pump 108. Discharge line 106 has a directional valve depicted at 110 for directing the flow of liquid from pump 108 either downwardly into tube 50 or into compartment 20 through discharge line 112, as shown in FIG. 5

Suction line 114 has a directional valve depicted by numeral 116 which controls the supply of liquid to pump 108 by way of line 118 disposed in filtrate compartment 20 or line 120 in communication with tube 50.

In operation, and with reference first to the valve configuration shown in FIG. 4, pump 108 discharges liquid under pressure from filtrate compartment 20 into tube 50 through line 106 thus expanding tube 50. When it is desired to remove filtercake from the filter fabric on filter elements 18, directional valves 110 and 116 are reversed to the configuration shown in FIG. 5 to draw liquid out from tube 50 via line 120 and pump 108 through discharge line 112 back into compartment 20. The pump-assisted discharge of liquid from tube 50 thus is effective to cause a sudden decrease in volume of tube 50 within compartment 22 for effective disengagement of filtercake from the filter fabric, as has been described.

Figure 6:
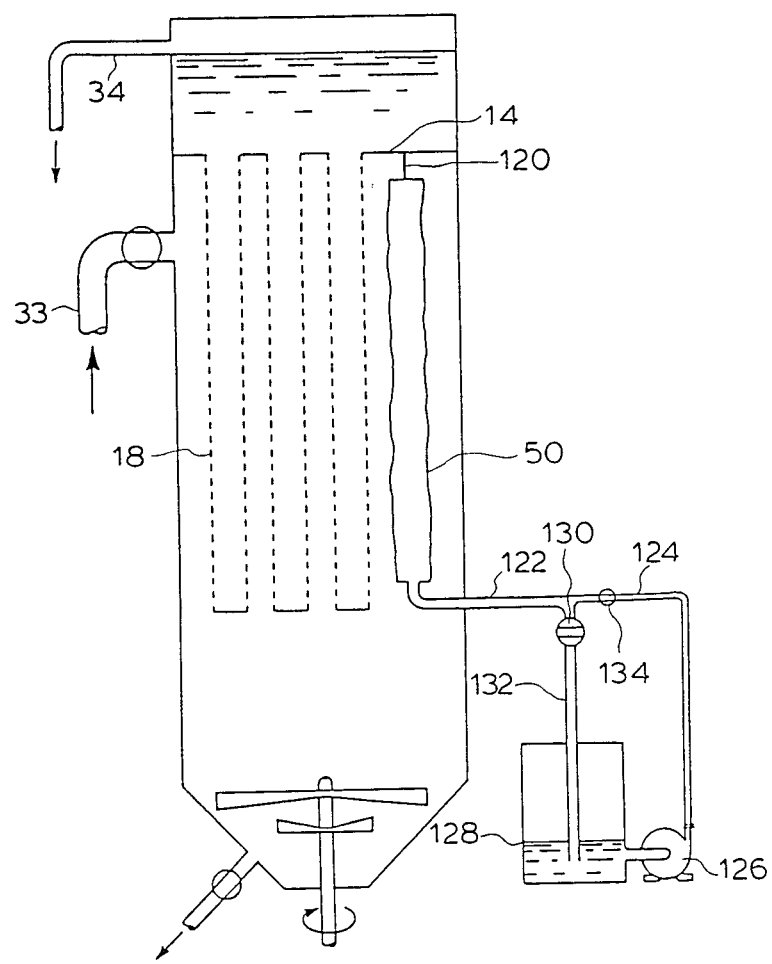
FIG. 6 displays schematically in a side elevation a still further embodiment of the invention.

Turning now to FIG. 6, the embodiment of the invention disclosed comprises elongated tube 50 secured at its upper end to the sidewall of vessel 10 by bracket 120 for vertical suspension within vessel 10. Tube 50 can be supplied with a fluid such as water through line 122 connected to line 124 and pump 126 which receives water from sump 128. Valve 130 in return line 132 is closed and valve 134 opened to permit water to flow under pressure from pump 126 through lines 124, 122 to tube 50 to fill said tube, and valve 134 closed and valve 130 opened to permit water to escape from tube 50 by gravity into sump 128 for sudden collapse of tube 50.

FIGS. 7 and 8 illustrate two embodiments of tube 50 having a rigid inlet 90 and rigid outlet 92. The cylindrical body wall 94 is formed of a pliable rubberized material reinforced to withstand internal high pressure, such as a pressure hose, which will permit substantial deformation and immediate collapse upon draining of fluid from the interior thereof. FIG. 8 illustrates the tube 50 enclosing a rigid cylindrical perforated core 96 maintained concentric with the outer wall of the tube by means of upper and lower spacers 98 to preclude complete collapse of wall 94 upon itself. The use of such a core assures a passageway for escape of the liquid within the tube during the backwash cycle. Because the static pressure within compartment 22 is greater at the bottom than at the top, there will be a tendency to collapse the tube 50 at the bottom in advance of the collapse at the top. If the outlet for the liquid tube 50 is at the bottom, the advance collapsing tube at the bottom may impede the desirable rapid escape of the liquid. Thus with reference to FIG. 1, tube 50 will collapse and allow the total escape of air out of the top of tube 50 without the need for an inner pipe core 96. However, if it is desired to release the air out of tube 50 from the bottom of tube 50, the earlier collapse of the tube at the bottom will impede the rapid escape of air out the bottom. Pipe core 96 would be used to advantage in this case, thus providing a rigid passageway for air or liquid. In the embodiments shown in FIGS. 3 and 6, the use of the pipe core is advantageous for the reasons given above.

The present invention provides a number of important advantages. Filter elements of a filter system can be cyclically backwashed by means of one or more collapsible tubes suspended in the mixture compartment of a filter vessel. Feed of the liquid-solids mixture to be filtered and discharge of thickened product need not be interrupted during the backwash operation. The various embodiments of the method and apparatus of the invention are simple in operation and in construction and can be readily installed in filter vessels, particularly filter vessels which are open to atmospheric pressure.

It will be understood, of course, that modifications can be made in the embodiment of the invention illustrated and described herein without departing from the scope and purview of the invention as defined by the appended claims.

What I claim as new and desire to protect by Letters Patent of the United States is:

1. In a vessel for filtering solids from a liquid-solid mixture including a lower mixture compartment with a solids discharge outlet and an upper filtrate compartment with a filtrate discharge outlet, a filter element enveloped by a filter fabric suspended from said filtrate compartment into the mixture compartment, and means for supplying a liquid-solids mixture to the mixture compartment under pressure for passing liquid through the filter element with deposit of filtercake on the filter fabric and flow of filtrate to the filtrate compartment, the improvement for backwashing the filter element with filtrate comprising a collapsible tube suspended in the mixture compartment, said tube having an expanded volumetric displacement at least as great as the volume of filtrate required to flow from the filtrate compartment into the filter element to expand the filter fabric and to reverse flow through the filter to disengage the filtercake thereon, and means to fill the tube with a fluid selected from the group consisting of air, water and filtrate for expansion thereof and to rapidly empty the fluid from said tube for sudden collapse thereof.

2. The vessel as claimed in claim 1 wherein said tube additionally has an expanded volumetric displacement to compensate for continuing introduction of liquid-solids mixture into the vessel during backwashing of the filter element.

3. The vessel as claimed in claim 1 wherein the tube has an open end and a closed end and said means to fill and to rapidly empty fluid from said tube comprise means to supply fluid under pressure at a pressure greater than the pressure of the surrounding mixture in the mixture compartment, said means to supply fluid being connected to the open end of the tube and having valving means for selectively introducing the fluid under pressure for expanding the tube and for suddenly discharging fluid from the tube for sudden collapse of the tube.

4. The vessel as claimed in claim 3 wherein the tube is vertically suspended in the mixture compartment and has an upper end and a lower end, lower end of the tube is the open end thereof, said fluid s water, and said means to supply fluid connected to the open are communicated with a sump and a pump located at a height lower than the tube for draining water thereinto for sudden of water from the tube and for recycle of water under back into the tube for expansion thereof.

5. The vessel as claimed in claim 1, wherein the tube has an open end and is vertically suspended in the mixture compartment with the open end up, said fluid is a liquid selected from the group consisting of filtrate and water, and said means to fill and to rapidly empty the fluid from the tube comprises a compartment containing said liquid, a pump having a suction line extending into said compartment containing said liquid and into said tube, and said pump having a discharge line extending into said compartment containing said liquid and into said tube, said suction and discharge lines each having valving means for selectively withdrawing the liquid from said compartment containing said liquid or said tube and discharging the liquid into said tube or compartment containing said liquid whereby the tube can be filled by the liquid pumped from said compartment containing said liquid or suddenly collapsed by pumping the liquid from the tube into the compartment containing said liquid.

6. The vessel as claimed in claim 5 wherein said liquid is filtrate and said compartment containing said liquid is the filtrate compartment mounted at a height greater than the height of the mixture compartment.

7. The vessel as claimed in claim 3 wherein the tube is vertically suspended in the mixture compartment and the open end is an upper end thereof, said fluid is filtrate, and said means to supply fluid connected to the open end include a pump communicating with said valving means in communication with filtrate in the filtrate compartment whereby filtrate can be pumped under pressure into the tube for expansion thereof and said filtrate pumped out of said tube for sudden collapse thereof.

8. The vessel as claimed in claim 1 wherein the tube is vertically suspended in the mixture compartment, said tube has an upper end and a lower end and is open at both said ends, said fluid is a liquid, and said means to fill and to rapidly empty the fluid from said tube comprise a reservoir located above the height of the tube and a sump located at a height below the tube, an upper valve conduit communicating said reservoir to the upper end of the tube, a lower valved conduit communicating the lower end of the tube to said sump, and a conduit in series with a pump for recycling liquid from the sump to the reservoir whereby closing of the lower valved conduit an opening of the upper valved conduit allows liquid under pressure to fill the tube and opening of the lower valved conduit and closing of the upper valved conduit allows sudden discharge of liquid from the tube.

9. The vessel as claimed in claim 1 wherein said tube is vertically suspended in the mixture thereof chamber and comprises an elongated cylindrical tube, a rigid upper inlet and a rigid lower outlet, and a rigid cylindrical perforated core extending from the inlet to the outlet concentric with the cylindrical tube.

10. The vessel as claimed in claim 4 wherein said tube comprises an elongated cylindrical tube, a rigid inlet and outlet means at the open lower end thereof, and a rigid cylindrical perforated core extending the length of the cylindrical tube.

11. The vessel as claimed in claim 8 wherein said tube is vertically suspended in the mixture chamber and comprises an elongated cylindrical tube, a rigid upper inlet and a rigid lower outlet, and a rigid cylindrical perforated core extending from the inlet to the outlet concentric with the cylindrical tube.

12. A method for backwashing filter elements in a vessel for filtering solids from a liquid-solids mixture including a lower mixture compartment and an upper filtrate compartment, a plurality of filter elements each enveloped by a filter fabric suspended from said filtrate compartment into the mixture compartment, and means for supplying a liquid-solids mixture to the mixture compartment for passing liquid through the filter elements with the deposit of filtercake on the filter fabric and flow of filtrate to the filtrate compartment, comprising vertically suspending at least one collapsible tube in the mixture compartment, said tube having an expanded volumetric displacement at least as great as the volume of filtrate required to reverse the flow from the filtrate compartment into the filter elements to expand the filter fabric and to disengage the filtercake deposited thereon, and intermittently filling said tube with a fluid for expansion thereof and rapidly emptying fluid from said tube for sudden collapse thereof.

13. A method as claimed in claim 12 wherein said tube additionally has an expanded volumetric displacement to reverse flow through the filter fabric to disengage the filter cake deposited thereon.

14. A method as claimed in claim 12 wherein said tube additionally has an expanded volumetric displacement to compensate for continuing introduction of liquid-solids mixture into the vessel during backwashing of the filter elements.

15. The method as claimed in claim 14 wherein said tube comprises an elongated cylindrical tube, a rigid upper inlet and a rigid lower outlet and a rigid cylindrical perforated core extending from the inlet to the outlet concentric with the cylindrical tube.

* * * * *